(12) United States Patent
Fechalos et al.

(10) Patent No.: US 11,354,205 B1
(45) Date of Patent: Jun. 7, 2022

(54) REDUNDANT BUS CIRCUIT BREAKER ADAPTER ASSEMBLY AND POWER DISTRIBUTION SYSTEM

(71) Applicant: C&C Power, Inc., Carol Stream, IL (US)

(72) Inventors: William Fechalos, Carol Stream, IL (US); Kevin Long, Carol Stream, IL (US)

(73) Assignee: C&C Power, Inc., Carol Stream, IL (US)

( * ) Notice: Subject to any disclaimer, the term of this patent is extended or adjusted under 35 U.S.C. 154(b) by 0 days.

(21) Appl. No.: 17/512,350

(22) Filed: Oct. 27, 2021

Related U.S. Application Data (60) Provisional application No. 63/118,165, filed on Nov. 25, 2020.

(51) Int. Cl.
*G06F 11/20* (2006.01)
*G06F 1/18* (2006.01)
*H02J 9/06* (2006.01)

(52) U.S. Cl.
CPC .......... *G06F 11/2015* (2013.01); *G06F 1/189* (2013.01); *H02J 9/061* (2013.01)

(58) Field of Classification Search
CPC ...... G06F 11/2015; G06F 1/189; G06F 11/20; G06F 1/18; H02J 9/061; H02J 9/06
See application file for complete search history.

(56) References Cited

U.S. PATENT DOCUMENTS

2013/0201608 A1 * 8/2013 Mills ........................ H02B 1/14
361/636

* cited by examiner

*Primary Examiner* — Robert L Deberadinis
(74) *Attorney, Agent, or Firm* — Crowell & Moring LLP (57) ABSTRACT

An apparatus, system and method of efficiently configuring a power distribution system includes the provision of a dual-bus power distribution assembly, each bus of which may be connected to power sources and where the circuit breakers are adapted such that power from either of the two buses can be routed to an electrical load to provide redundant or non-redundant power, as required. Each circuit breaker position is capable of being configured to connect between either of the two buses and an individual load equipment supply bus. The circuit breaker may be a plug-in type where one of the terminals is adapted by a part that may be installed in one of two orientations. In the first orientation a first bus is connected to the individual load equipment supply bus and in the second orientation the second bus is connected to the individual load equipment supply bus.

20 Claims, 12 Drawing Sheets

REDUNDANT BUS CIRCUIT BREAKER ADAPTER ASSEMBLY AND POWER DISTRIBUTION SYSTEM

This application claims the benefit of priority to U.S. provisional application Ser. No. 63/118,165 "REDUNDANT BUS CIRCUIT BREAKER ADAPTER ASSEMBLY AND POWER DISTRIBUTION SYSTEM", filed on Nov. 25, 2020, which is incorporated herein by reference in its entirety.

TECHNICAL FIELD

This application may be relevant to the control and distribution of electrical power.

BACKGROUND

Direct current (DC) power is needed for many types of telephone communication equipment, for control equipment used at electric utility substations, for computer data centers, and power plants, and other similar uses. The DC power may be supplied, for example, by a DC power source which may convert AC power from an external AC power source, such as the local power grid, or a generator and prime mover to DC power. DC Power may be obtained directly from solar cells, fuel cells or other sources that are known in the art or may be developed. In other circumstances the DC power source, may include a storage battery system to provide un-interruptible power during an outage of the input power source. In some instances, the individual equipment or cabinets of equipment may be supplied directly from a DC power source.

The DC power source may have sufficient capacity to supply a plurality of electrical and electronic devices such as computers, switch arrays, telecommunications equipment or the like, where each one of the devices consumes less than the maximum capacity of the DC power source. It may be desirable to control the provision of the power to each individual device or to groups of devices, so as to facilitate the removal and replacement of a device for, for example, servicing, to disable and re-power for rebooting a computer, or the like. Each connection of a load to a power supply bus may be protected by a circuit breaker (CBs), fuse or similarly functioning component in case of a fault resulting in an excess current demand.

For flexibility in configuring local DC power distribution, a power supply may be connected to a bus from which the power is distributed to a plurality of individual DC loads through individual circuit breakers (CD), switches, or the like. Each load may have a different nominal power requirement and the CB used to connect the load to the bus may be appropriately sized and the arrangement configured so that the total power requirements of the loads connected to the bus is within the capacity of the power supply. In the usual course of events, equipment failures may occur and circuit breakers may be tripped, or the bus-connected power supply may fail.

Existing DC power distribution assemblies may provide for a plurality of suitably rated circuit breakers connecting between a power bus and individual outputs of the power distribution assembly which may then route the power over suitably sized conductive cables to the using equipment. Where a redundant power source is required for some or all of the equipment, the distribution assembly may be configured with a second power bus with circuit breakers sized for the designated loads and connected thereto by separate cables.

Often such power distribution assemblies are generic in nature, providing for a fixed maximum number of circuit breakers for a bus. In some installations, not all of the positions may be need to be populated with circuit breakers for a particular installation. The number and location of using equipment's requiring redundant DC power may vary with each rack or system design. This may lead to inefficient use of the circuit breaker numerical capacity and complicate the layout of the connecting cables to as to provide a second bus for the redundancy requirement.

SUMMARY

Disclosed herein is an apparatus and adapter part that provides for a dual bus or redundant configuration of a power distribution panel, where a circuit breaker installed in the power distribution panel can be configured so that the circuit breaker is inserted in the circuit of the first bus or the second bus, depending on the configuration of a metallic adapter part. This simplifies the configuration of a power distribution system where at least two power sources are connected to one or more electrical loads having different load protection ratings, and the routing of power cables between the apparatus and the loads.

The apparatus may comprise a front panel having an aperture sized and dimensioned to accept a circuit breaker, the circuit breaker having a first terminal and a second terminal spaced apart by a first distance; a first common power bus; and a second common power bus, and each bus may be connected to a separate power supply. Each of the first common power bus and the second common power bus has a plurality of sleeve sockets mounted thereto, the spacing between adjacent sleeve sockets on each power bus being compatible with the spacing of the circuit breakers insertable through the front panel. The sleeve sockets mounted on the first common power bus and the second common power bus are mounted so as to be separated by a predetermined distance from each other. Further, a plurality of sleeve sockets are mounted to individual buses that connect to output terminal of the apparatus so as to provide a power circuit to individual loads. The location of the output bus sleeve sockets is determined so that each output sleeve socket is configurably associated with a sleeve socket on the first common bus and a sleeve socket on the second power bus.

This triad of sleeve sockets is used to permit selection of connecting the first common power bus or the second power bus to supply the individual output bus, depending on the configuration of the circuit breaker adapter part. A conventional plug-in circuit breaker is adapted, using a metallic bracket so that, depending on the orientation of the bracket as affixed to the circuit breaker, one of the first or the second power buses is connected to the individual output power bus.

The circuit breaker may have stud terminals to which bullet extensions are mounted so as to provide the plug-in capability. One of the bullet extensions may be retained, although it may have a further axial extension so as to mate with the associated sleeve. The other of the stud terminals may be fitted with an adapter bracket part. This adapter bracket may be a U-channel J-channel or the like where a through-hole is provided on one of the faces thereof so that the bracket may be bolted to the stud terminal. Offset from the through-hole, and on the opposite external face of the bracket, a bullet extension may be mounted. The adapter bracket may be fixed in one of two positions by rotating the bracket prior to fastening the bracket to the circuit breaker stud. In a first position, the circuit breaker may connect to one of the common busses and to the individual output bus; in the other of the two positions, the circuit breaker may connect to the other of the two common busses and to the individual output bus.

In this manner, a particular installation may be designed where the location of circuit breakers in the apparatus serving specific loads may be selected, so that the appropriate bus is selected. The circuit breakers may have differing operating characteristics depending on the load requirements, and each output bus is independent. This means that the connection from the output bus to the load may be physically routed in an efficient manner depending of the location of the load with respect to the apparatus, and the circuit breakers serving a load may be located in a more logical manner.

A combination of redundant power supply to a load, using the capabilities of the two buses and non-redundant power to other loads, using a selectable one of the two busses may be configured.

As examples, a single large power supply may be connected so as to supply all of the loads in a non-redundant configuration, or a separate power supply may connect to each of the common buses so as to provide a redundant configuration.

A power distribution system may be configured efficiently by combining appropriate power supplies, the dual-bus apparatus described herein and conventional circuit breakers as modified using the adapter part. Since the full number of circuit breaker positions may be populated, regardless of the number of circuits fed from each of the common buses, the space needed for the circuit breakers can be reduced as compared with present systems which pre-allocate the connection of the first common bus to the individual output buses and the connection of the second common bus to the individual output buses.

BRIEF DESCRIPTION OF THE DRAWINGS

FIG. 7 is a perspective view of the conductive elements of the system, including the plurality of output buses engaged with the individual circuit breakers and the output bus connection to the rear output terminals;

DESCRIPTION

In a non-limiting example, a dual-bus power distribution assembly (DBA) may be configured to mount in a 19 inch or 23 inch equipment rack or similar and occupy 2U of vertical rack space. A 19 panel configuration may provide, for example, 14 single-pole circuit breaker positions and a 23 inch panel may provide 20 single-pole circuit breaker positions, and may have space for a status or control display. The assemblies may be configured with a first DC bus 20 and a second independent DC bus 30. A circuit breaker 50 in any location on the panel may be assigned may be assigned to either the bus 20 or the 30 bus by the user. Each bus may be connected to a separate DC power supply of suitable capacity. This flexibility allows multiple configurations, such as all of the breakers to be on a single bus or a dual-bus configuration with circuit breakers connected to the either bus depending on the load power and redundancy requirements. The total capacity of the DBA may be doubled, for example, by connecting both of the independent buses to a non-redundant power supply source having twice the capacity of a single bus rating.

For the particular embodiment being described, the maximum current on any one breaker position may be 100 A with a maximum single-bus current of 250 A. The second bus may have a same rating. Circuit breakers of an appropriate rating between about 0.1 and 100 A may be selected as required. The assembly can operate in either 24 or 48 VDC systems. The equipment (load) side of the breakers are terminated, for example, on a terminal block on the rear of the assembly, each terminal capable of supporting 100 A. Bolted or other suitable electrical jointing techniques may be used. A Load Return connection may be located on the rear panel of the assembly.

Equipment may be designed with similar functionality for higher voltages and currents providing the physical dimensions, conductor spacing, insulation techniques and the like are consistent with safety standards and electrical codes.

The dual-bus assembly (DBA) disclosed herein permits the circuit breakers for either of the two buses supplying redundant power to a load to be located next to each other, simplifying the cable routing between the assembly and the load. Moreover, where a circuit breaker services a non-redundant load, the power cable may be routed from the assembly to the load in an efficient manner and the appropriate position for the circuit breaker selected subsequently. This simplifies and neatens cabling of the power distribution system.

Figure 1:
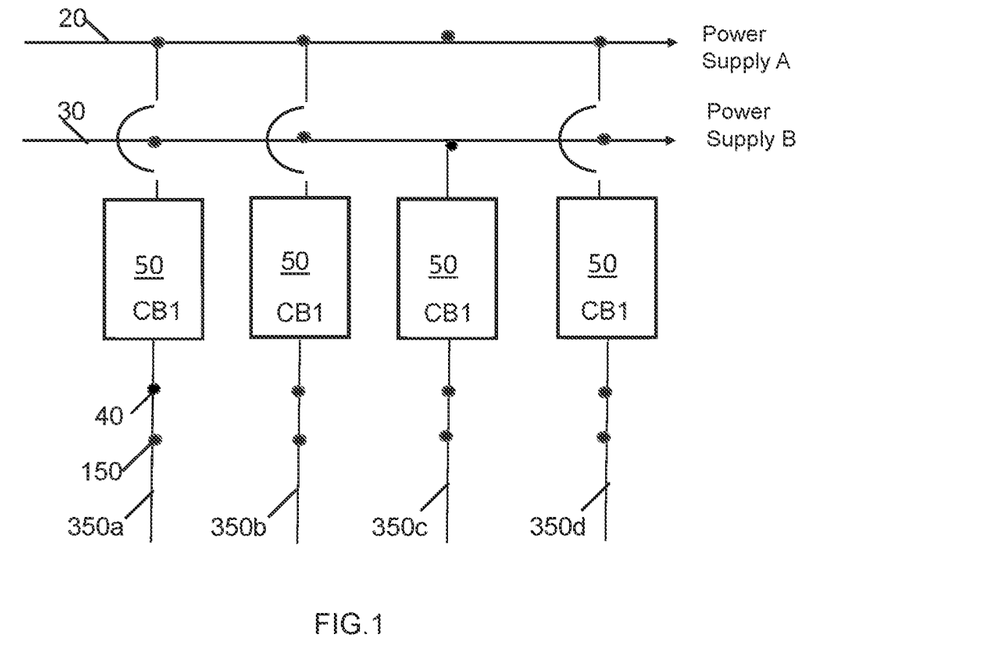
FIG. 1 is a portion of exemplary single-line electrical schematic of the redundant bus circuit breaker power distribution system showing connections made between either of two input buses and an output bus.

FIG. 1 is a single-line electrical diagram of a portion of the DBA illustrating the connection of several circuit breakers (CB) 50, disposed between a selected one of a first input power bus, 20, or a second input power bus, 30 and an output bus 40 connecting to a output terminal 150 to which the electrical load 350 a-d is attached by a distribution cable. As connected, a continuous conductive path is created from the power supply through the selected bus (20 or 30), the circuit breaker 10 and the output bus 40 to the output terminal 150. The circuit breaker 50 in each occupied panel position is selected based on technical characteristics related to protection of the load and the power supply connected to the associated bus. The sum of the current ratings of the circuit breakers connected to each one of the buses is limited to the rating of input bus or the external power supply connected to the input bus, whichever is the smaller value. Similarly, the maximum current rating of any circuit breaker may be limited to the current rating of the individual output bus connecting to the load.

It would be appreciated by persons of skill in the art that selection of circuit breaker types may depend on the load transient start up or overload characteristics as well as the characteristics of the power supplies. Circuit breakers may be designed to be pluggably mated with a distribution assembly or to be attached to distribution cables by bolts, clamps, screw terminals or the like. The detailed specifications of a circuit breaker may in include surge current characteristics, overload tolerance, activation time or the like. A DBA may accept circuit breakers having a compatible form factor but diverse operating characteristics. A suitable circuit breaker for the example described in detail herein may be a Heinemann hydraulic magnetic circuit breaker as described in Eaton Corporation catalog for "AR and AP Series" circuit breakers, CA130002EN, July 2016, available on-line or from Eaton Industries Manufacturing GmbH, 7 Route de la Longeraie, 1110 Morges, Switzerland.

Such circuit breakers may be configured with a variety of input/output connection types which may include screw terminals, posts, threaded studs or the like and are available from Heinemann Canada Ltd., Montreal, Canada.

A circuit breaker having threaded stud connections may be fitted with bullet extensions so as to pluggably mate with sleeve sockets to connect to the input and output buses where the locations of the sleeve sockets are positioned to be compatible with the spacing between the two bullet extensions.

Figure 3:
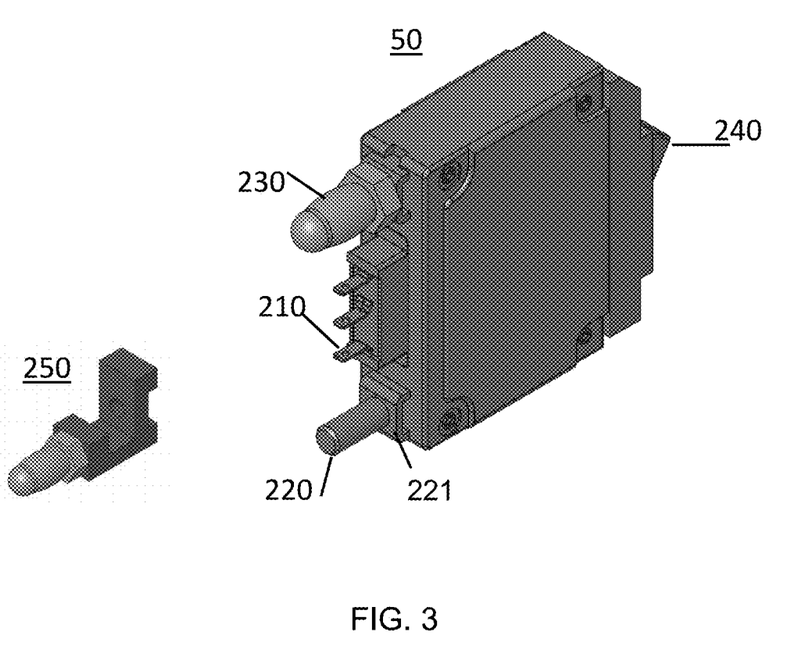
FIG. 3 shows a rear perspective image of a typical electrical circuit breaker and an adapter part configured to be attached to one of the output terminals of the circuit breaker and positioned to mate with a selected one of the input buses.
Figure 4A:
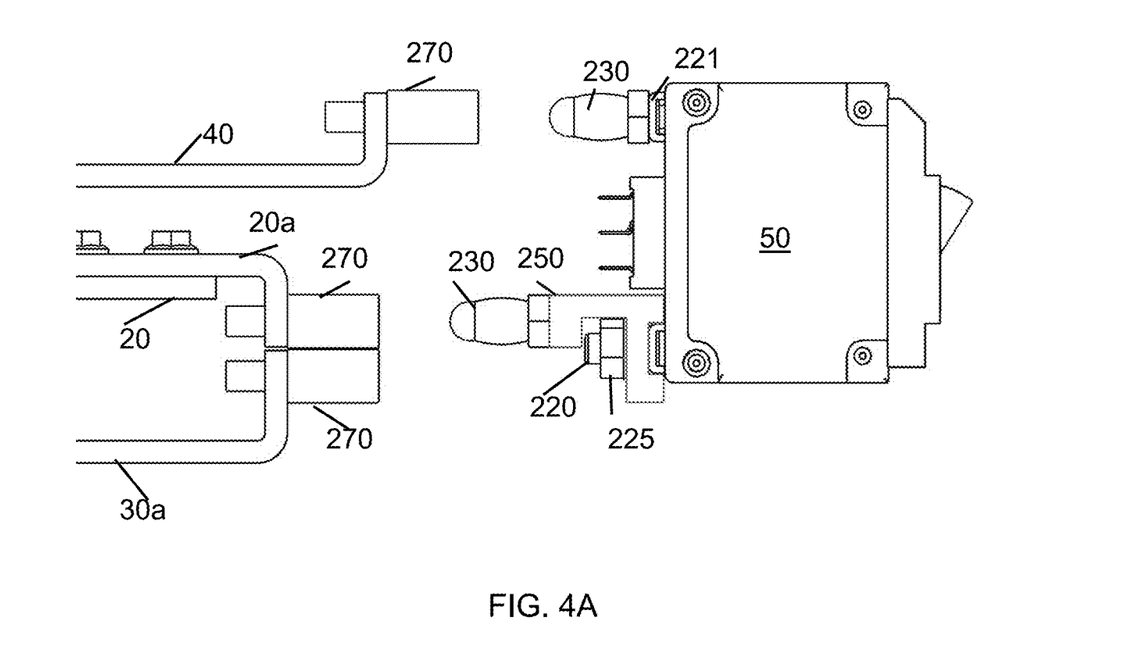
FIG. 4A shows a side view of the circuit breaker with the adapter part attached in a superior (uppermost) position to a bottom terminal of the circuit breaker and positioned in relation to the corresponding sockets of the output bus with the relative vertical spacing to permit the adapted circuit breaker to pluggably mate therewith.

An example of suitable bullet extension would be a M3 or 6-32 stud which would mate, for example with an Eaton K03860LL sleeve socket (FIG. 4A, 270). As seen in FIG. 3, the one of the studs 220 may be terminated at the breaker with a bracket 250, and a bullet extension 230 may be threaded onto the other stud 220. For purposes of this embodiment, a lower one of the two bullet extensions 230 may be removed from the corresponding stud and threaded onto a stud on a dual-bus adapter part 250, which will be described herein.

In the present example, a circuit breaker may be individually configured so as to connect to either one of two input busses so as to provide for redundant power inputs to a specific load, or to select the bus to supply a non-redundant load. An adapter part used to select the configuration is sized and dimensioned so as to permit the installation of the circuit breaker through the front panel of the DBA in an aperture that may be the same dimensions as would accept an unmodified circuit breaker. By enlarging the aperture, a configuration, permitting selection between any of three input buses may be feasible.

The location of the output bus 40 with respect to the input buses 20, 30 is not intended to be constrained by this example and is a matter of design choice. The circuit breaker 50 would be adapted accordingly.

In FIG. 1, CB1, CB2 and CB4 are shown connected to input bus 20 and CB3 is connected to input bus 30. This may represent a configuration where loads 350a and 350b are redundant power inputs to a single electrical load, where the load is capable of accepting redundant power input from two sources. The configuration may represent a load 350c, connected to bus 20 in a non-redundant fashion and load 350d connected to bus 30 in a non-redundant fashion. The configurations are established by the power cables connected to the output terminals 150 of the DBA for each particular equipment installation.

Figure 2:
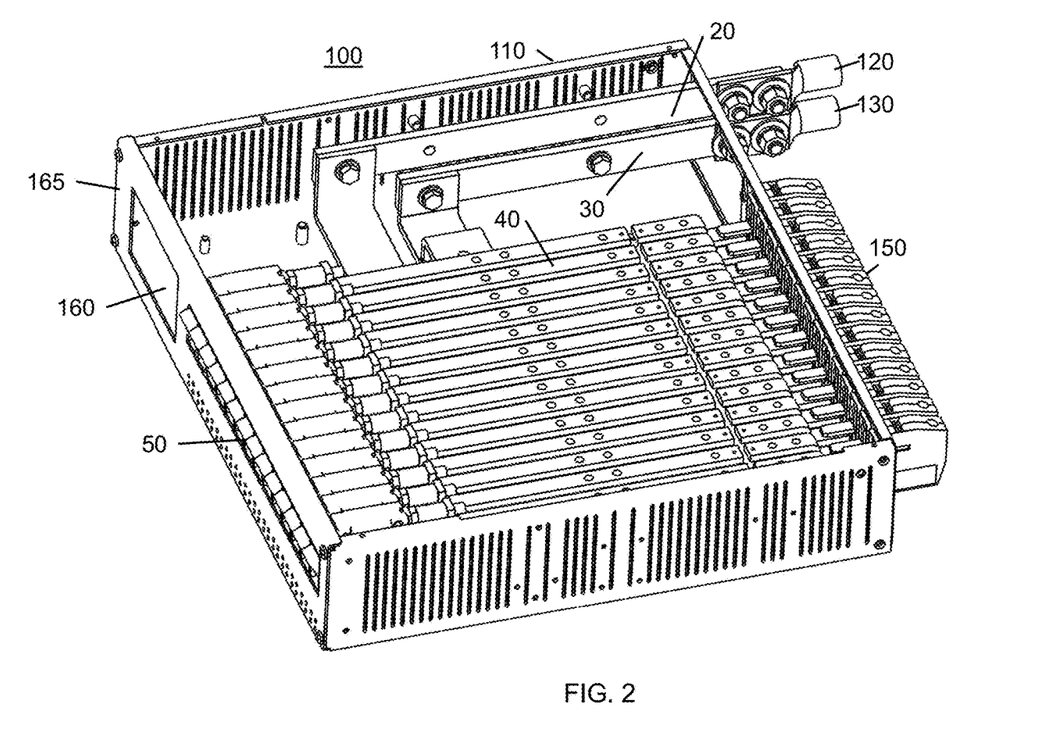
FIG. 2 is a perspective view of an embodiment of the system, in an enclosure suitable for mounting in an electrical rack, with the cover removed and with insulating and other passive supporting structures not shown for clarity.

FIG. 2 is a partial perspective view of the DBA 100 where, in addition to the components shown in the electrical diagram of FIG. 1, a housing 110 (with the cover removed) the rear output terminal block 150, and a front panel 165, which may provide for an opening into which the individual circuit breakers may be inserted, and for any optional status display 160.

Generally the figures do not show any of the insulating structures or the structures for securing the various components to the chassis of the DBA as they are selected during the engineering design process so as to provide for separation of the two buses electrically from each other and from the remainder of the components, as well as with respect to the individual output buses 40. The buses may be copper aluminum of bar, flexible conductive strap, cables or the like, that are jointed or connected using techniques that are known in the art.

An example of a connector 120, 130 affixed to an end of a cable from the external power supply (not shown) to the buses 20, 30 uses a lug with two through holes that is bolted to an end of the associated bus. Other types of connectors may be used, providing they meet the electrical and mechanical design requirements. Similarly, the output terminal block 150 has a plurality of connection points, each connection point corresponding to the output of a single circuit breaker. Various styles of connection are known to those skilled in the art and would be selected based on power, voltage and mechanical considerations as would be appropriate in the circumstances. The conductive materials of the bus may typically copper, brass or aluminum.

Before describing the structure of the arrangement of the interior components in further detail, the adaptation of a conventional circuit breaker 50 to function as a component in the redundant bus configuration is described. FIG. 3 is a perspective image view focused on the rear of the circuit breaker. Here, the circuit breaker 50 is configured as having an input terminal 220 and an output terminal, each comprising a threaded stud 220. This may be seen clearly at the lower (input) terminal, however a bullet extension 230 has been threaded onto the upper stud 220. The dual-bus-adapter part 250 which is intended to be attached to the lower threaded stud 220 is shown in an unattached configuration. The dual bus adapter part 250 is sized and dimensioned so that an aperture in the front panel of the DBA 100 may permit the dual-bus-adapter part 250 to be positioned such that the lower stud 220 extends through the aperture 220 (see FIG. 8A so that a nut 225 may be threaded onto the stud 220 and tightened so as to captivate the dual bus adapter part 250 to the circuit breaker stud 220 in either of two positions. The aperture in the front panel may provide sufficient clearance for the adapter part 250 to pass through the aperture in the front panel without an interference fit.

Further, the dual-bus-adapter part 250 has a bullet extension 230 (which may have been removed from the corresponding circuit breaker stud), which is threaded onto a stud or bolt so as to extend the adapter part 250. The stud may be threaded into a aperture in the dual-bus-adapter part 250, or be a bolt passing through an aperture 222 which is captivated to the part 250 by screwing on the bullet extension 230, or the like.

The orientation of the part 250 may be selected between either a position where the bullet extension 230 is oriented horizontally in a superior position or in an inferior position, the positions differing by 180 degrees. The difference in the vertical dimension of the bullet extension 230 when oriented in the two positions is equal to the difference in vertical dimension of a corresponding socket connector associated with each of the two input buses of the DBA.

FIG. 4A is a detail drawing of the circuit breaker 50 with the dual-bus-adapter part 250 installed on the stud 220 and secured by a nut 225 so that the bullet extension is oriented in the superior horizontal position as viewed from a side of the circuit breaker 50. Also shown are the portions of the bus electro-mechanical structures with which it is intended to pluggably mate.

The dual bus structure 20, 30 is arranged so that a sleeve socket 270 on each bus is presented to the circuit breaker such that the bullet extension 230 of the dual-bus-adapter part 250 may mate with one of them, while the bullet extension 230 of the upper stud terminal of the circuit breaker 50 mates with a sleeve socket 270 attached to the corresponding output bus 40. The panel (not shown) may guide or position the circuit breaker 50 horizontally when inserted in the panel so as to mate with 2 of the 3 sockets that are fixedly mounted to the input and output buses.

Figure 4B:
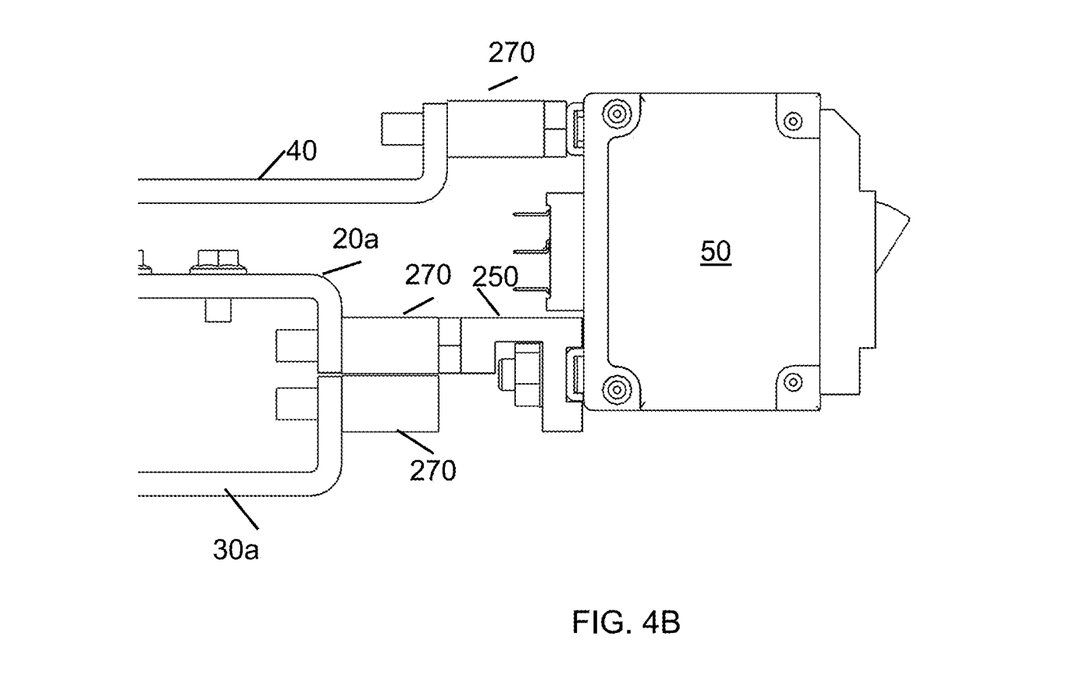
FIG. 4B shows a side view of the components of FIG. 4A mated with each other so that one terminal of the circuit breaker engages with the output bus and the other circuit breaker terminal engages with a selected input bus.
Figure 4C:
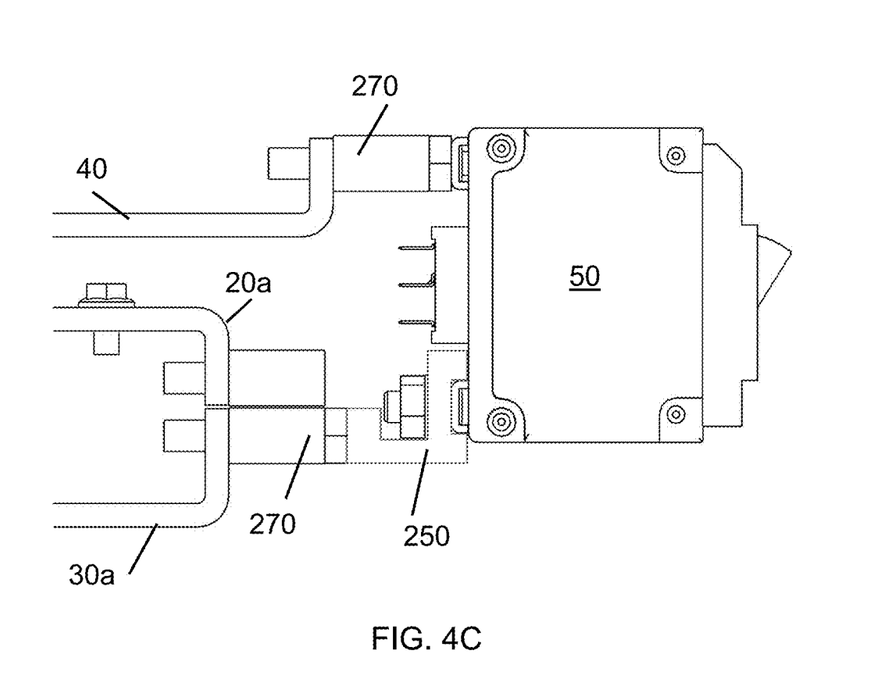
FIG. 4C shows a side view of the components of FIG. 4A with the adapter part attached in an inferior (lowermost) position to the bottom terminal of the circuit breaker and to mate to the other of the two input buses.

FIG. 4B shows the circuit breaker 50 and dual-bus-adapter part 250 mated with corresponding components of the DBA where the dual-bus-adapter part 250 is positioned in the superior position so that the bullet extension mates with the sleeve socket 270 associated with a first bus 20. FIG. 4C shows the circuit breaker 50 and dual-bus-adapter part 250 mated with corresponding components of the DBA where the dual-bus-adapter part 250 is positioned in the inferior position so that the bullet extension mates with the sleeve socket 270 associated with a second bus 30. In this manner any of the connections to an output terminal of the output block 150 may be serviced with power from the desired bus by configuring the circuit breaker 50 in the electrical path to connect to either the first or second bus by rotating the dual bus adapter part 250 by 180 degrees and fixing the part 250 in position using the nut 225 on the stud 220.

Figure 5:
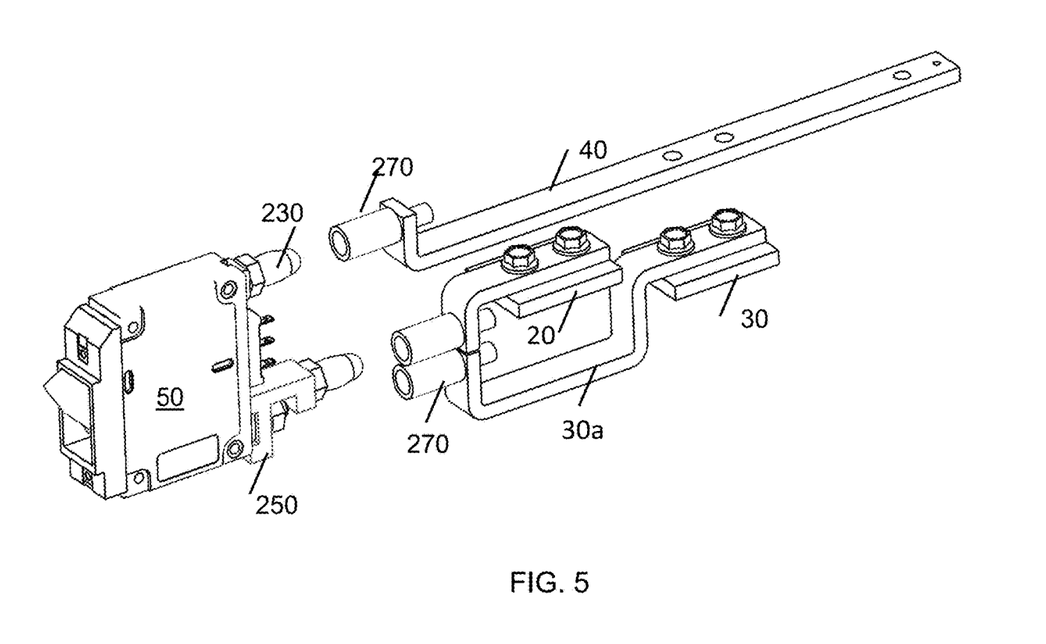
FIG. 5 is a perspective view of the components of FIG. 4A in an unmated state.

FIG. 5 shows the unmated adapted circuit breaker assembly from a front side perspective where a section including one circuit breaker position is presented. The output bus 40 for a single load leads from the front to the back of the DBA to route the power from one of the input buses (in this case 20) to a terminal of the output block 150 on the rear of the DBA 100. As the input to the buses 20, 30 is positioned at a rear side of the DBA and the individual circuit breakers are spaced apart in a direction orthogonal thereto, as may be seen in FIG. 2, each of the redundant buses 20, 30 makes a turn through a right angle (as well as rotating from a vertical to a horizontal orientation) in this embodiment so as to conform to the form factor of the enclosure of the DBA. These bus extensions 20a, 30a may be affixed, for example, by a nut and bolt to the continuous portion of each bus 20, 30. The nut and bolt assembly may be a compatible metal such as brass or steel in combination with a Bellville washer, or the like. Consequently, only a small section of each of the continuous input buses 20, 30 is seen in FIG. 5 where the circuit breaker 50 is shown disengaged from the buses and in relative alignment with the conductive portions of the buses prior to mating.

Jointing of bus elements and other conductive components may be by bolting, riveting, welding, soldering, brazing, connectors, or any such technique resulting in the appropriate mechanical and electrical properties.

The sleeve sockets 270 are attached in an end of each bus extension 20a, 30a so as to be spaced apart in a vertical direction by a distance conforming to difference in vertical distance of a centerline of the bullet extension 230 occasioned by the rotation of the dual-bus-adapter part 250 from a superior to an inferior position. The relative position of the pair of bus extensions may be maintained by an insulating material (not shown).

Figure 6:
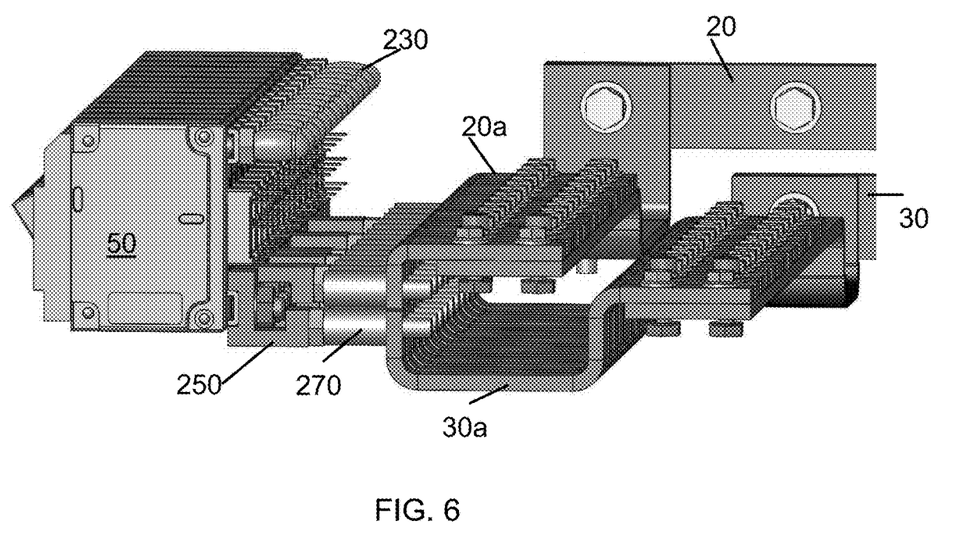
FIG. 6 is a perspective view of a plurality of circuit breakers mated with selected ones of the two input busses; the output bus structure is not shown for clarity.

A plurality of individual circuits are shown in FIG. 6 where the adapted circuit breakers 50 are shown configured to be inserted into either a first bus 20 or a second bus 30. The output bus 40 and sleeve socket assembly is not shown, for clarity.

Figure 7:
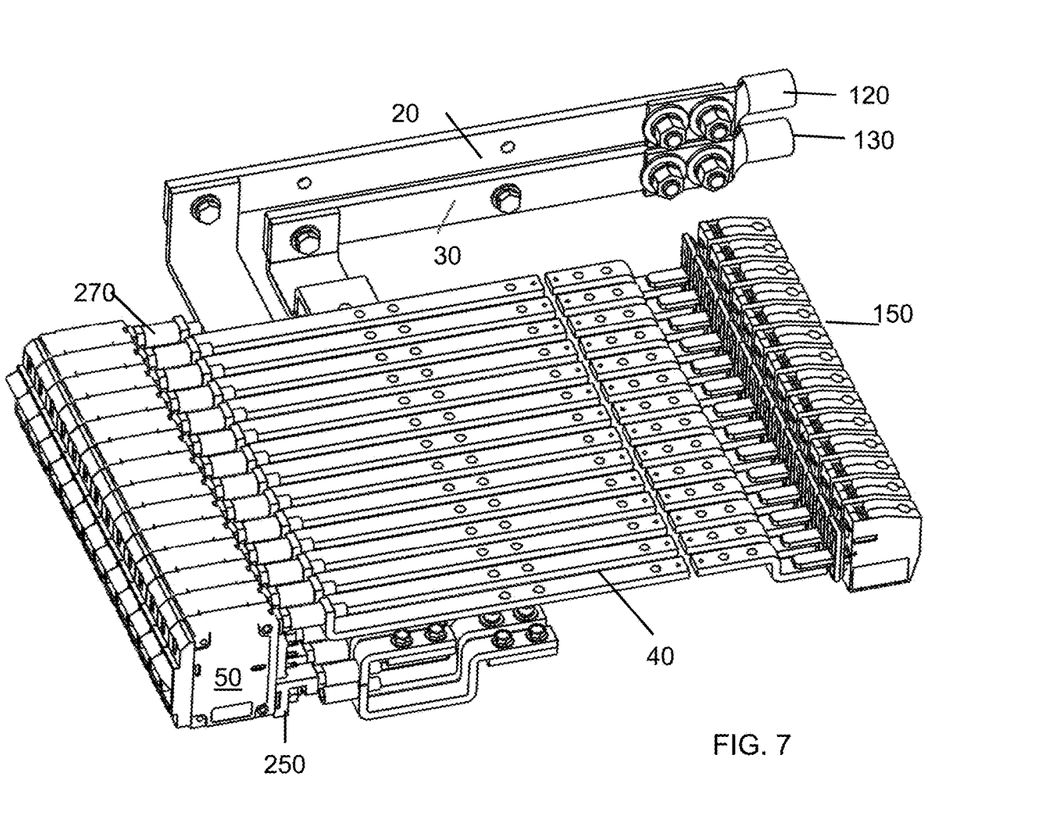
FIG. 7 shows a perspective image corresponding to the arrangement of FIG. 6 and having a plurality of adjacent adapted circuit breakers; individual circuit breakers are selectively associated with one or the other of the input buses.

FIG. 7 shows the principal electrical components of the DBA in relation to each other where a plurality of adapted circuit breakers 50 are inserted in the respective sleeve sockets 270. The length of the extension of the buses 20, 30, 40 behind the front of the DBA is for convenience in interfacing with the power supply inputs and the load distribution cables at the rear of an equipment rack. The depth of the DBA may be reduced for other types of installations.

Figure 8A:
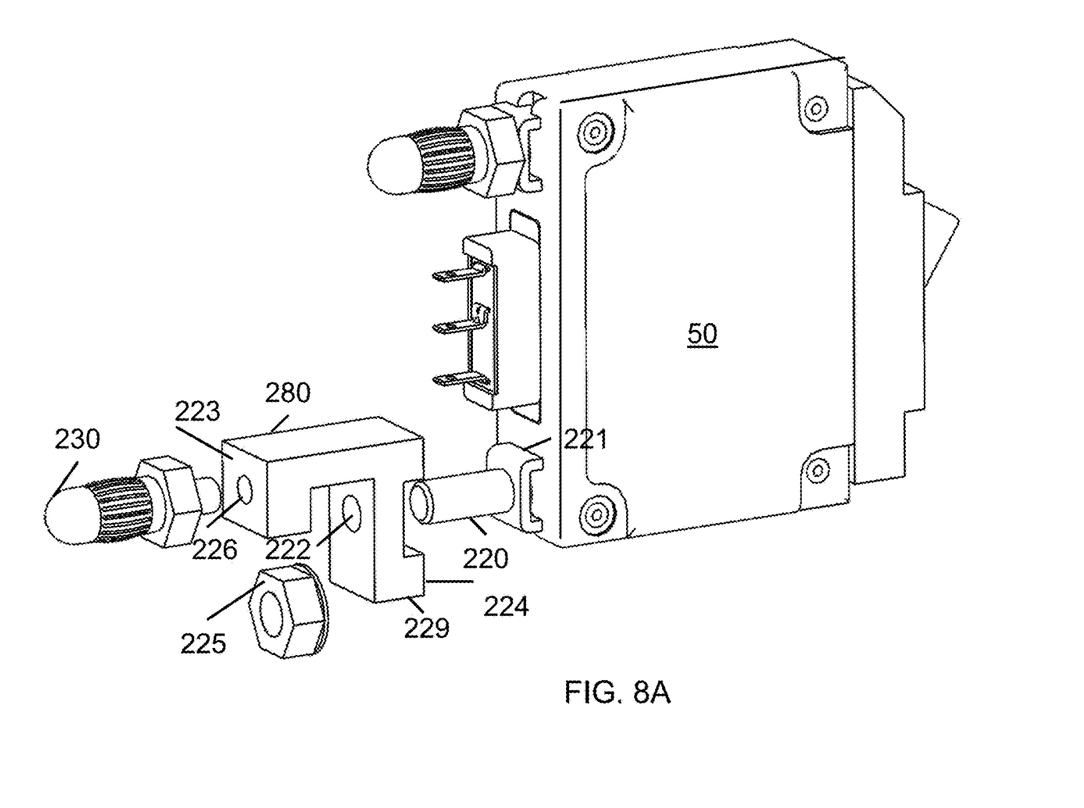
FIG. 8A is an exploded perspective view of the adapter part, positioned for assembly to the lower terminal of the circuit breaker and oriented in the superior (uppermost) position.

Other components such as current and voltage sensors, a monitoring and communications processor and display, network interface or safety fuses may be incorporated in the DBA in accordance with specific design requirements. FIG. 8A is a detailed drawing of the dual-bus-adapter part 250, including the bullet extension 230 and an example of the fastening of the bullet extension to the bracket. Overall, the dual-bus-adapter part 250 may be characterized as two plates (223 and 224) spaced apart so that the surfaces oppose each other by a web 280. A through hole 222 in a first mounting plate 224 sized to accept the stud 220. The second mounting plate 223 has a hole 226 that may be threaded to accept a stud of similar characters to stud 220 so that the bullet extension 230 may be threaded thereon. In some examples the hole may be a though hole and threaded to accept the stud, or be unthreaded so as to accept a bolt, which would be captivated to the first mounting surface by the bullet extension 230.

Figure 8B:
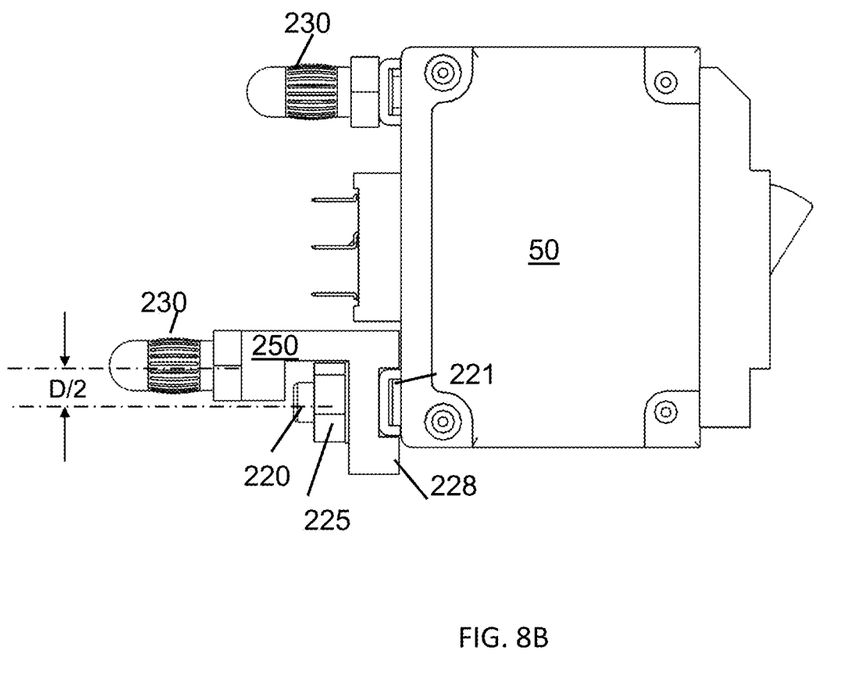
FIG. 8B shows a side view of the components of FIG. 8A in an assembled state.
Figure 8C:
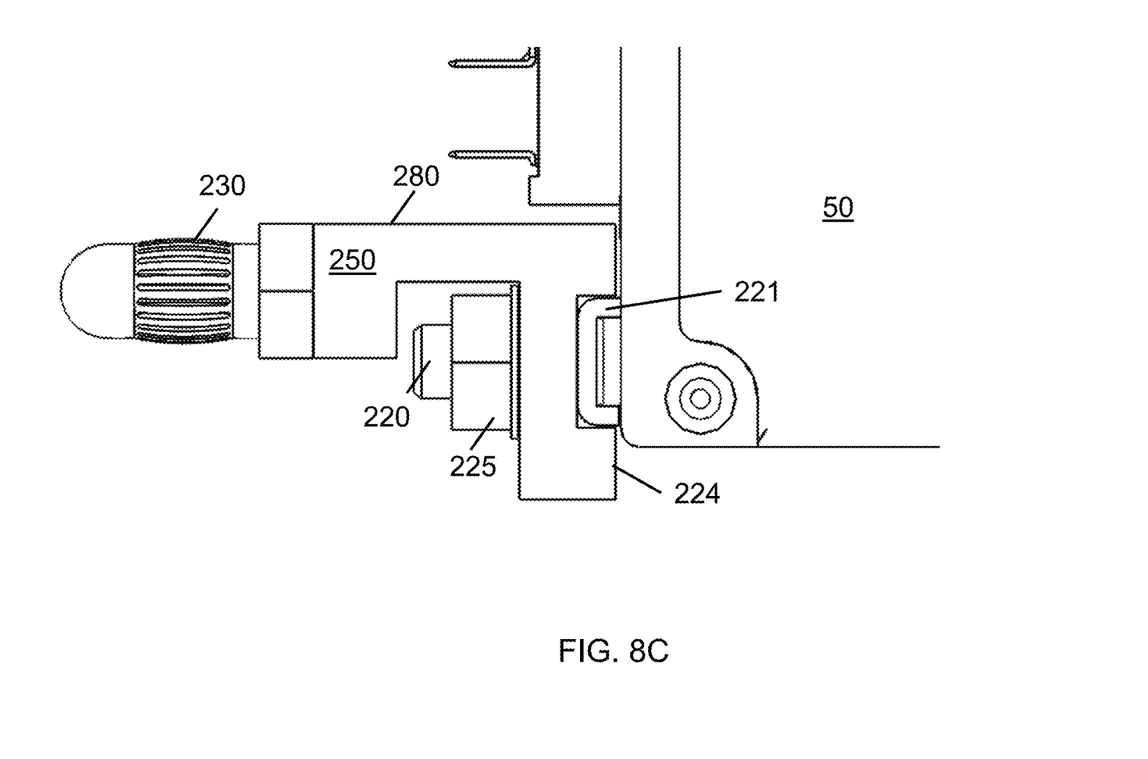
FIG. 8C is an expanded view of the adapter part of FIG. 8B showing a configuration of the mounting surface intended to facilitate the location of the adapter part in a superior (shown) or inferior position with respect to the circuit breaker.

The surface of the first plate 224 may be planar, or may be adapted (as shown) to conform to a feature 221 of the terminal so as to facilitate locating the dual-bus-adapter part 250 for assembly. When assembled, the through hole 222 is fitted onto the stud 220, and captivated thereto by a nut 225. A washer may be provided as well.

A center line of the hole 222 and a centerline of the hole 226 are parallel to each other but displaced with respect to each other. In this example the centerlines are displaced in a direction transverse to the holes such that rotating the installation of the dual-bus-adapter part 150 through 180 degrees from a superior position (bullet at maximum vertical position) to an inferior vertical position (bullet at a minimum vertical position) results in a difference in height, D, between the two positions equal to a distance determined between the sleeve sockets 270 of the bus 20 and the bus 30. The sleeve sockets 270 of the two buses need not be disposed directly above each other, so long at the spacing between the center lines of the holes results in a mating configuration, when the part has been rotated from a first installation position to a second installation position.

As the nut 225 is threaded over the stud 220 to install the part, sufficient space between opposing surfaces of the first plate 223 and the second plate 224 is provided. The spacing may be slightly greater than the thickness of the nut 225 (and any washer) as the nut may be threaded onto the stud 222 during installation as it passes through the hole 222.

The relative sizes of the plates 223 and 224 are shown as examples only, as it is the relative positions of the holes 222 and 226 that determine the offset occasioned by installing the part 250 in one of the two orientations described. When installed, preferably the width of the dual-bus adapter part is less than or equal than that of the circuit breaker 50 so as to minimize the required separation between adjacent circuit breakers. So, the overall longitudinal cross section shape of the dual-bus adapter part 250 may be a squared-off U or J shape.

Thus, the bullet extension 230 is positioned so that it may be threaded onto a stud to form the connection to the bus, selected by the rotational positioning of the adapter part when attached to the circuit breaker. The axis of the hole for accommodating the stud of the circuit breaker and the axis of the stud onto which the bullet extender 230 is to be mounted are offset by the half of the centerline distance between the sleeve sockets 270 of the buses 20, 30 to which the adapted circuit breaker 50 can mate.

The dimensions of the dual-bus-adapter part 250 may be sized with respect to those of the circuit breaker 50 so that, when installed on the circuit breaker, the dimension of the dual-bus-adapter part 250 transverse to the studs is less than or equal to the corresponding dimension of the circuit breaker 50, so that the circuit breaker 50 with the dual-bus-adapter part 250 may be inserted through the aperture in the front panel. In any installation where not all of the circuit breaker positions are needed, the gaps between the circuit breakers is covered as is a normal practice.

A person of skill in the art will recognize that a circuit breaker in any position in the row of circuit breakers inserted through the front panel may be configured to form a circuit-breaker-protected connection between either input bus 20, 30 and an individual output bus 40.

The number of loads connected to each bus may be flexibly determined based on the current demand and circuit breaker sizing for each load and the total capacity of each bus. Further, there is additional flexibility in the positioning of the exterior distribution wiring and the most convenient routing scheme hay be employed with the circuit breaker position assignments selected to correspond to the appropriate connection.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

A method of distribution of electrical power may include the provision of a DBA and connecting an output bus to a corresponding power input of a load. An adapted circuit breaker type and rating is selected based on the power requirements of the connected load and configured to connect between one of the two input buses and the output bus. Plugging the circuit breaker into the corresponding position of the front panel provides the connectivity between the power supply and the electrical load. The selection of the bus to be connected, in each instance, is determined by the particular installation design and may be governed by the individual power requirements of the loads, including redundancy requirements, and the capacity of the power supplies connected to the input buses.

A method of modifying a circuit breaker to be compatible with a DBA includes providing an adapter bracket part, suitable for mounting to one of the terminals of the circuit breaker so that the spacing between the connection portion of the terminal is positionable to mate with a selected input electrical bus; and, attaching the modified adapter bracket part to the circuit breaker in the selected orientation.

While the methods disclosed herein have been described and shown with reference to particular steps performed in a particular order, it will be understood that these steps may be combined, sub-divided, or reordered to from an equivalent method without departing from the teachings of the present invention. Accordingly, unless specifically indicated herein, the order and grouping of steps is not a limitation of the present invention.

It is therefore intended that the foregoing detailed description be regarded as illustrative rather than limiting, and that it be understood that it is the following claims, including all equivalents, that are intended to define the spirit and scope of this invention.

What is claimed is:

1. An apparatus comprising:
   a front panel having an aperture sized and dimensioned to accept a circuit breaker, the circuit breaker having a first terminal and a second terminal spaced apart by a first distance;
   a first common power bus; and
   a second common power bus,
     wherein the first common power bus and the second common power bus have plurality of first and second sleeve sockets, respectively, each of the first sleeve sockets and the second sleeve sockets disposed along a length along thereof and spaced apart by a distance equal to a centerline spacing between adjacent circuit breakers; a pair of sleeve sockets comprising a adjacent first sleeve socket and the second sleeve socket of the plurality of first and second sleeve sockets, spaced apart by a second distance;
   a plurality of third sleeve sockets, each third sleeve socket associated with the pair of sleeve sockets and having a conductive connection to an output terminal; and
     wherein the circuit breaker is adaptable by a conductive bracket part to mate with the third sleeve socket and a selectable one of the first or the second sleeve sockets of the pair of sleeve sockets.

2. The apparatus of claim 1, further comprising at least one adapted circuit breaker inserted through the front panel and configured to be pluggably mate with the third sleeve socket and one of the pair of first and second sleeve sockets.

3. The apparatus of claim 2 wherein the circuit breaker is adapted to include a bullet extension of the first terminal.

4. The apparatus of claim 1, wherein the circuit breaker is adapted to include the conductive bracket part including a bullet extension, selectively positionable with respect to the second terminal of the circuit breaker in one of two alternate positions, so that the adapted circuit breaker pluggably mates with one of the first sleeve socket or the second sleeve socket and with the third sleeve socket to complete an electric circuit.

5. The apparatus of claim 4, wherein the conductive bracket part comprises a first portion having a through hole sized and dimensioned to conform to a diameter of the second terminal and a second portion having a stud for mounting the bullet extension.

6. The apparatus of claim 5 wherein the conductive bracket part is secured to the second terminal in one of the alternate mating positions by a nut threaded onto the second terminal.

7. A circuit breaker adapter part, comprising:
  a conductive structure, being a section of a channel having a length less than or equal to a width of a circuit breaker and a first arm and a second arm disposed orthogonal to a connecting piece; and
  a bullet extension fastened to an outside face of the arm of the channel,
    wherein the second arm of the channel has a through-hole sized and dimensioned to accept a stud terminal of a circuit breaker, a centerline of the through-hole being parallel to a centerline of the bullet extension,
    wherein the circuit breaker adapter part is sized and dimensioned such that distance between the centerline of the through-hole and the centerline of the bullet extension is half of to distance between a first sleeve socket and a second sleeve socket of an apparatus to which the bullet extension is configured to be pluggably mated when mounted to the stud terminal of the circuit breaker.

8. The circuit breaker adapter part of claim 7 wherein the conductive structure is fabricated from copper, brass, or aluminum.

9. A kit, comprising:
  a conductive structure, being a section of a conductive channel having a length less than or equal to a width of a circuit breaker and a first arm and a second arm; and
  a bullet extension fastened to an outside face of the arm of the conductive channel,
    wherein the second arm of the conductive channel has a through-hole sized and dimensioned to accept a stud terminal of a circuit breaker, a centerline of the through-hole being parallel to a centerline of the bullet extension,
    wherein a adapter is sized and dimensioned such that distance between the centerline of the through-hole and the centerline of the bullet extension is half of the distance between first sleeve socket centerline and a second sleeve socket centerline of an apparatus to which the bullet extension is configured to be pluggably mated when mounted to the stud terminal of a circuit breaker;
  a nut sized and dimensioned to thread on to the stud terminal to fasten the conductive channel to the circuit breaker; and
  a circuit breaker having the stud terminal.

10. A method of supplying power to a plurality of loads, comprising:
  a front panel having an aperture sized and dimensioned to accept a circuit breaker, the circuit breaker having a first terminal and a second terminal spaced apart by a first distance;
  a first common bus; and
  a second common bus,
    wherein the first common bus and the second common bus have plurality of first and second sleeve sockets, respectively, each of the first sleeve sockets and the second sleeve sockets disposed horizontally along a length of a corresponding bus and spaced apart by a distance equal to a centerline spacing between adjacent circuit breakers; a pair of sleeve sockets comprising a first sleeve socket and a second sleeve socket of the plurality of first and second sleeve sockets, the first sleeve socket and the second sleeve sleeve socket of the pair of sleeve sockets spaced apart by a second distance;
  a plurality of third sleeve sockets, each third sleeve socket associated with the pair of sleeve sockets and having a conductive connection to an output terminal; and
  a common return terminal,
    wherein the circuit breaker is adaptable to mate with the third sleeve socket and a selectable one of the first or the second sleeve socket of an associated pair of sleeve sockets;
  the method further comprising;
  providing the circuit breaker;
  providing a circuit breaker adapter part;
  securing the circuit breaker adapter part to the circuit breaker in a one of two selectable orientations; and
  mating the adapted circuit breaker part with the third sleeve socket and one of the first or second sleeve sockets corresponding to the selected one of two selectable orientations.

11. A conductive adapter part, comprising:
  a first metallic plate adapted to bear on a surface;
  a second metallic plate spaced apart by a first distance from the first metallic plate by a web and facing the first metallic plate;
    wherein that first metallic plate has a first through-hole sized and dimensioned to accept a stud terminal of a circuit breaker, the first through-hole having a first centerline; and the second metallic plate having a through-hole or a stud having a second centerline; the distance between the first metallic plate and the second metallic plate being at least equal to a thickness of a nut to engage the stud terminal, a width of the adapter part being less than or equal to a width of the circuit breaker; and, when the part is rotated about the stud terminal from a first position to a second position, a second distance between the centerline of the bullet when in the first position is changed by a second distance equal, the second distance being equal to the spacing of the centerline of the the two adjacent sleeve sockets to which the circuit breaker is intended to mate.

12. The adapter part of claim 11, further comprising:
  the stud terminal having a same thread pattern as a bullet extension; and
  the bullet extension, configured to mate with the sleeve socket and threaded onto the stud terminal.

13. The adapter part of claim 11, further comprising:
a stud terminal having a same thread pattern as a bullet extension; and
the bullet extension, configured to mate with a sleeve socket, threaded onto the stud terminal,
wherein the through-hole having the second centerline is a threaded through-hole.

14. The adapter part of claim 11, further comprising:
a bolt having a same thread pattern as a bullet extension; and
the bullet extension, configured to mate with a sleeve socket, threaded onto the bolt,
wherein the through-hole having the second centerline is sized and dimensioned to accept the bolt and the bolt is captivated to the second plate by the bullet extension.

15. The adapter part of claim 11, wherein the first metal plate is a planar surface configured to bear against a conductive flat portion of the circuit breaker.

16. The adapter part of claim 11, wherein the first metallic plate is a planar surface having a recessed portion surrounding the through-hole and configured to bear against a flat portion of the circuit breaker to locate an orientation of the adapter part.

17. A system for distributing electrical power, comprising:
a dual-bus configuration where each bus is connectable to a separate source of electrical power;
wherein the apparatus has a panel capable accepting a plurality of circuit breakers of differing operating characteristics;
a separate output bus connectable to each electrical load;
a plurality of plug-in circuit breakers,
wherein each of the plug-in circuit breakers is adapted and configurable to connect between either bus of the dual-bus configuration and any separate output bus.

18. The system of claim 17, where a first bus of the dual-bus apparatus is connectable to a first power source and a second bus of the dual-bus apparatus is connectable to a second power source.

19. The system of claim 17 wherein both buses of the dual-bus apparatus are connected to a common power source.

20. The system of claim 17, at least one bus of the dual-bus configuration is connected to a power suitable to be connected to an output load.

* * * * *